United States Patent
Shute (10) Patent No.: US 7,444,986 B2
(45) Date of Patent: Nov. 4, 2008

(54) DUAL FUEL ENGINE

(75) Inventor: Colin Robert Shute, Pateley Bridge (GB)

(73) Assignee: Intelligent Diesel Systems Limited, Tong Hall, Tong, West Yorkshire (GB)

( * ) Notice: Subject to any disclaimer, the term of this patent is extended or adjusted under 35 U.S.C. 154(b) by 36 days.

(21) Appl. No.: 10/506,625

(22) PCT Filed: Mar. 4, 2003

(86) PCT No.: PCT/GB03/00882

§ 371 (c)(1),
(2), (4) Date: May 11, 2005

(87) PCT Pub. No.: WO03/074856

PCT Pub. Date: Sep. 12, 2003

(65) Prior Publication Data

US 2005/0205021 A1    Sep. 22, 2005

(51) Int. Cl.
*F02B 7/00*    (2006.01)

(52) U.S. Cl. .................. 123/431; 123/27 GE; 123/526

(58) Field of Classification Search .................. 123/431, 123/304, 575, 27 GE, 525–527, 299–300, 123/481, 198 DB, 557; 701/103–105
See application file for complete search history.

(56) References Cited

U.S. PATENT DOCUMENTS

| | | | |
|---|---|---|---|
| 4,463,734 A | 8/1984 | Akeroyd | |
| 4,742,801 A | 5/1988 | Kelgard | 123/27 |
| 4,865,001 A | 9/1989 | Jensen | |
| 5,140,965 A | 8/1992 | Nogi et al. | |
| 5,444,628 A | 8/1995 | Meaney et al. | |
| 5,546,908 A | 8/1996 | Stokes | 123/480 |
| 5,673,668 A | 10/1997 | Pallett et al. | |
| 6,073,592 A | 6/2000 | Brown et al. | |
| 6,550,430 B2 * | 4/2003 | Gray | 123/27 GE |
| 6,561,157 B2 * | 5/2003 | zur Loye et al. | 123/295 |
| 6,789,511 B2 * | 9/2004 | Hertweck et al. | 123/1 A |
| 7,121,254 B2 * | 10/2006 | Wickman et al. | 123/304 |
| 2002/0007816 A1 | 1/2002 | Zur Loye et al. | |

FOREIGN PATENT DOCUMENTS

| | | |
|---|---|---|
| WO | WO 01 34962 A | 5/2001 |
| WO | WO 02/081895 A1 | 10/2002 |

* cited by examiner

*Primary Examiner*—Hai H Huynh
(74) *Attorney, Agent, or Firm*—Winstead PC (57) ABSTRACT

A dual fuel engine (2) is provided which is supplied with diesel fuel and at least one secondary fuel, such as LPG. The engine (2) has a plurality of cylinders (4, 6, 8, 10) in which pistons reciprocate. Each cylinder has diesel injectors (4A, 6A, 8A, 10A) for injecting the diesel fuel into the cylinder during an appropriate stroke of the piston and an air inlet valve (4C, 6C, 8C, 10C) which opens during the appropriate stroke of the piston to permit air flow therethrough. Each cylinder is further provided with LPG injectors (4B, 6B, 8B, 10B) for injecting the secondary fuel into the cylinders. The LPG injectors are independent to and separate from the diesel fuel injectors. The LPG and diesel fuel injectors are also independently controlled.

27 Claims, 4 Drawing Sheets

DUAL FUEL ENGINE

BACKGROUND OF THE INVENTION

1. Field of Invention

This invention relates to a dual fuel engine, and more specifically to a method for converting a conventional diesel engine to one which is capable of receiving both diesel and at least one second fuel, which is most commonly liquid petroleum gas (LPG) or less commonly compressed natural gas (CNG). The invention also relates to and is to be considered as extending to a dual fuel engine or multi-fuel engine which operates in a particular manner as hereinafter described.

2. Background of Invention

Although the following description is provided with exclusive reference to the conversion of conventional diesel engines to engines which are capable of receiving both diesel and LPG as the main combustive fuel components, the skilled reader will appreciate that the following invention can easily be adapted to allow for conversion of conventional diesel engines to permit them to utilize a wide variety of different gases, and therefore the invention should not be considered as solely limited to dual fuel or diesel/LPG engines.

Dual fuel engines have been produced in the past, and indeed it has for a long time period been known that the combination of diesel fuel with LPG inside the cylinders of an engine not only can improve efficiency of the engine, but automatically reduces the overall fuel costs of operating the engine. For example, in the UK, diesel fuel typically currently retails for around £0.76 per litre, whereas LPG can readily be obtained for around £0.23 per litre. However such cost savings must be offset against the cost of converting the diesel engine.

Currently, it is generally the case that most conventional diesel engine conversions are time consuming, elaborate and expensive. As the reader will be aware, diesel engines are not provided with spark plugs as the ignition of the diesel fuel is achieved solely by pressure developed in the cylinders by virtue of the reciprocating motion of the pistons and additionally by virtue of the inherent heat of the engine during operation. It is this latter requirement for heat that necessitates a delay between initially starting the engine (which causes a heater to operate) and firing the engine, i.e. causing the driveshaft on which the pistons are mounted to rotate.

In replacing some of the diesel which is injected into the cylinders with an amount of LPG, it is necessary to remove the diesel injectors and the diesel injection pump and fit reduced capacity components in their place, change the head gasket of the engine to reduce the compression ratio achieved in the cylinders, and fit a distributor to adjust the timing of the engines. A conventional conversion, particularly for a large diesel engine such as might be provided in a locomotive or articulated lorry may cost in the region of £28,000. Of course this figure depends on the size of the engine, and in particular the number of cylinders within the engine.

Notwithstanding the expense of diesel engine conversion, the advantages in terms of fuel cost savings and efficiency characteristics achieved by conversion often outweigh the cost, and many conversions have at the present time been conducted. Indeed relevant prior art reflects this fact.

For example, U.S. Pat. No. 4,463,734 discloses a diesel-based engine which is designed to burn a mixture of LPG and diesel. The diesel is injected into the cylinders in the conventional manner, but in addition to this, LPG in its gaseous phase is mixed with the airflow which is essential to the proper functioning of the engine. In general, engines may be normally aspirated, in which case the air is forced into the engine simply by virtue of the forward motion of the vehicle in which the engine is mounted, or alternatively the engine may be turbocharged in which case a small turbine driven by the exhaust gases from the cylinder is linked to a compressor to compress the air within the inlet manifold before it is delivered into the engine cylinders. This results in improved performance and additionally enhances the efficiency of the engine. Regardless of the condition of the air when it is introduced into the engine, the air is essential as it provides a supply of oxygen to fuel the combustion. In the abovementioned U.S. patent, the LPG is mixed with the incoming air so that the inlet manifold to the engine contains both a supply of oxygen and gaseous LPG. This mixture is then introduced into the cylinders of the engine in the same way that a conventional air stream would be introduced, namely through the air inlet valves of each cylinder.

As mentioned above the diesel continues to be injected into the cylinders through specifically adapted injectors provided on each cylinder.

The U.S. patent goes on to describe how the governor of the diesel engine is coupled to an LPG regulator so that as the load on the engine increases, the percentage of total fuel delivered to each cylinder of the engine which is LPG increases significantly quicker than does that percentage of total fuel which is diesel, this latter increase being achieved under the conventional operation of the engine and not being regulated in any way by the governor. Specifically, the inventor mentioned in connection with said U.S. Patent the realisation that when the engine was idling or operating under very light loads the amount of diesel as expressed as a percentage of the total fuel weight (i.e. diesel and LPG) introduced into the cylinder should be relatively high, typically in the region of 75%, whereas when the engine was operating under heavy or full load conditions, the amount of diesel expressed a percentage of the total fuel delivered should be quite low, typically of the order of 20%. Under these parameters, the engine could operate significantly more powerfully, more efficiently, and at lower cost.

However, a fundamental disadvantage of the invention described in this patent is the predetermined nature of the operating characteristics necessitated by the direct mechanical link between the LPG regulator (which is a valve in the main embodiment) and the governor of the diesel engine. For instance, under a particular load, the governor of the engine will necessarily operate in a particular manner causing the regulator to open or close to a predetermined extent. Accordingly, the system proposed in the U.S. Patent is inflexible.

A further disadvantage of this invention is the fact that the LPG is mixed with the incoming air flow in a plenum ring prior to entry of the air into the cylinders of the engine. This further precludes versatile operation of the engine.

SUMMARY OF INVENTION

It is an object of the invention to provide a dual fuel engine and management system therefor which is flexible, can be easily adapted to different types of dual fuel combinations (e.g. diesel/LPG, diesel/CNG, and diesel/other liquid or gaseous combustive material giving high combustion thermal output), and which is capable of significantly reducing the overall emissions of the engine over a wide operating profile.

According to a first aspect of the invention there is provided a dual fuel engine, said engine supplied with diesel fuel and at least one secondary fuel, said engine including one or more cylinders in which one or more pistons reciprocate, each of said one or more cylinders being provided with diesel injection means for injecting the diesel fuel into the cylinder during an appropriate stroke of the piston and at least one air inlet valve, said valve moving to an open condition during said appropriate stroke of the piston to permit air flow therethrough, characterised in that each cylinder of the engine is further provided with secondary fuel injection means for injecting the secondary fuel into the cylinders, the secondary fuel injection means being independent of the diesel fuel injection means and air inlet valves.

By providing the secondary fuel injection means independent to and separate from the diesel fuel injection means, this provides the engine with greater flexibility and increases the ease with which an engine can be converted to utilise other fuels in addition to diesel. Control of the operation of the secondary fuel injection means is also typically independent to that of the diesel injection means, thereby providing the engine with greater flexibility to changing engine operating conditions.

Preferably the secondary fuel injection means are controlled to introduce the secondary fuel in the one or more cylinders on the appropriate stroke of the piston reciprocating therein.

Preferably, the engine is provided with a pair of supply tanks for containing diesel and the secondary fuel, both of which are delivered to the engine through separate supply means, such as supply pipes.

Preferably, the injection of the secondary fuel into the cylinders occurs substantially simultaneously with the injection of the diesel fuel through the diesel fuel injection means.

Preferably, the secondary fuel is LPG.

Preferably means are provided for sensing and/or controlling one or more engine operating conditions.

It is yet further preferable that the amount of secondary fuel flowing into the engine is regulated by flow control means, typically in the form of a flow control unit (FCU).

Most preferably the output of the flow control means is coupled to the input of a multi-output divider which divides a singular flow of secondary fuel into a plurality of flows, said plurality corresponding in number to the number of cylinders in the engine and said plurality of flows being coupled to said secondary fuel injection means.

Most preferably the flow of secondary fuel to the secondary fuel injectors is regulated dynamically according to one or more sensed engine operating characteristics, and most preferably the dynamic regulation is applied to the flow control means for altering the amount of secondary fuel flowing therethrough.

Most preferably the engine includes an integrated control unit (ICU) which has one or more of the following:

One or more inputs in communication with sensing means disposed in and around the engine for sensing one or more operating characteristics thereof, means capable of receiving and processing a user input calibration means through which maintenance and adjustment of one or more algorithms and/or operating parameters of the ICU can be achieved, such as might be required for converting a diesel/LPG engine to a diesel/CNG engine one or more outputs for displaying relevant information concerning the operating characteristics of the engine, e.g. the instantaneous relative percentages of diesel and secondary fuel being delivered to the engine, and outputs for connection to one or more dynamically adjustable components of the engine for dynamic control thereof during engine operation.

It is still yet further preferable that the emergency shut off valves are provided in fuel supply means which deliver the diesel fuel and secondary fuel to the engine.

Preferably vaporising means are provided in fuel supply means for delivering the secondary fuel to the engine. The ICU typically controls the vaporising means.

In a particular embodiment, both flow control means and vaporising means are provided in the fuel supply means/pipes which deliver the secondary fuel to the engine, said ICU controlling both the flow control means and a diaphragm within the vaporiser, both of which are adjusted to regulate the flow of the secondary fluid through each component.

The flow control means may be provided in addition to the vaporiser to prevent any back pressure developed in the supply pipe between the FCU and the engine as a result of back- or mis-fires thereof from destroying the diaphragm in the vaporiser unit.

It is to be mentioned that in general the flow control means in the supply pipe delivering the secondary fuel to the engine is typically optional, whereas the vaporising means/vaporiser tends to be more essential as vaporisers are commonly provided with a heating element which is required to gasify the LPG, which is usually a liquid at the pressures (of the order of 1-3 bar above atmospheric pressure) at which LPG is usually stored.

The ICU is connected to the FCU and the vaporiser and can cause adjustment of same, not least in adjustment of the amounts of secondary fuel permitted to flow therethrough but also as regards the temperature of the heating element therewithin. Also, the ICU may receive a feedback in terms of the vaporiser to allow said ICU to determine the temperature of the LPG exiting the vaporiser.

Most preferably the ICU is connected to sensing means in the form of a plurality of sensors adapted to sense a variety of engine operating characteristics or factors representative of such characteristics. A non-exhaustive list of characteristics which the sensors may sense include:

Exhaust emissions, in particular exhaust gas particulate measurements such as density and chemical composition Exhaust gas particulate density Throttle position Temperature of the secondary fuel being delivered to the engine and/or the engine operating temperature itself Turbo pressure Airflow velocity and/or pressure Secondary fuel gauge Engine speed FCU position, in particular the position of the piston inside the FCU whose position is changed to alter amount of secondary fuel permitted to flow therethrough Vaporiser diaphragm position Most preferably the operation of the ICU is continuous and concomitantly the volume of secondary fuel being delivered through the engine through the vaporising means and flow control means is continually and continuously being adjusted depending on the feedback from the various different engine operating characteristics being measured.

Most preferably the ICU includes a processor and associated memory means in which one or more pre-determined parameters for efficient engine operation are stored. The memory means may include RAM, ROM, PROM, EPROM, or any combination of these. The memory means typically contains one or more algorithms implemented in suitable code which can be executed by the processor when certain trigger or pre-determined conditions are met, for example when the engine is started, when the secondary fuel runs out when the load on the engines reaches a pre-determined or desired level or is outside a certain level.

Most preferably the ICU performs a calculation on the various values received on its inputs from the one or more sensing means using the algorithms stored, and the result of the calculation will usually be a value to which the vaporiser diaphragm or FCU piston must be set to achieve the most efficient or most powerful output for those particular operating conditions.

It is to be mentioned that the ICU may have been pre-programmed with a plurality of different algorithms adapted to achieve different engine responses for a given set of operating characteristics. For example, if maximum engine power is to be delivered and little or no concern for emissions is required, then a particular algorithm or set of algorithms may be selected, whereas if minimum emissions are crucial, then a different algorithm or set thereof may be selected.

It is yet further preferable that a secondary fuel limiter is provided to prevent any "over-powering" of the engine which would drastically reduce its operating life.

It is still yet further preferable that a recalibration algorithm is included in the ICU which enables said ICU to adjust its own operation as the engine and associated components undergo wear.

According to a second aspect of the present invention there is provided an integrated control unit (ICU) for controlling the operation of a dual fuel engine, said engine supplied with diesel fuel and at least one secondary fuel, said engines including one or more cylinders in which one or more pistons reciprocate, each of said one or more cylinders being provided with diesel injection means for injecting the diesel fuel into the cylinder during an appropriate stroke of the piston and at least one air inlet valve, said valve moving to an open condition during said appropriate stroke of the piston to permit air flow therethrough, each cylinder of the engine being further provided with secondary fuel injection means for injecting the secondary fuel into the cylinders, the integrated control unit providing independent control of the operation of the secondary fuel injection means and the diesel fuel injection means.

Preferably control of the operation of at least the secondary fuel injection means is in response to one or more sensed engine operating characteristics.

According to a further aspect of the present invention there is provided a method of converting a diesel engine to a dual fuel engine, said engine supplied with diesel fuel and at least one secondary fuel, said engine provided with one or more cylinders in which one or more pistons reciprocate with injection means for injecting diesel fuel into the cylinder during an appropriate stroke of the piston and at least one air inlet valve, said valve moving to an open condition during said appropriate stroke of the piston to permit air flow therethrough, characterised in that said method includes the step of providing each cylinder of the engine with secondary fuel injection means for injecting the secondary fuel into the cylinders, the secondary fuel injection means being provided independently to the diesel fuel injection means.

According to a yet further aspect of the present invention there is provided a vehicle having a dual fuel engine fitted therein, said engine supplied with diesel fuel and at least one secondary fuel, said engine including one or more cylinders in which one or more pistons reciprocate, each of said one or more cylinders being provided with diesel injection means for injecting the diesel fuel into the cylinder during an appropriate stroke of the piston and at least one air inlet valve, said valve moving to an open condition during said appropriate stroke of the piston to permit air flow therethrough, characterised in that each cylinder of the engine is further provided with secondary fuel injection means for injecting the secondary fuel into the cylinders, the secondary fuel injection means being independent of the diesel fuel injection means and air inlet valves.

It has been suggested by the applicant that this dynamic system can in certain circumstances increase engine power output by up to 50% and reduce noxious particular emissions equally significantly.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
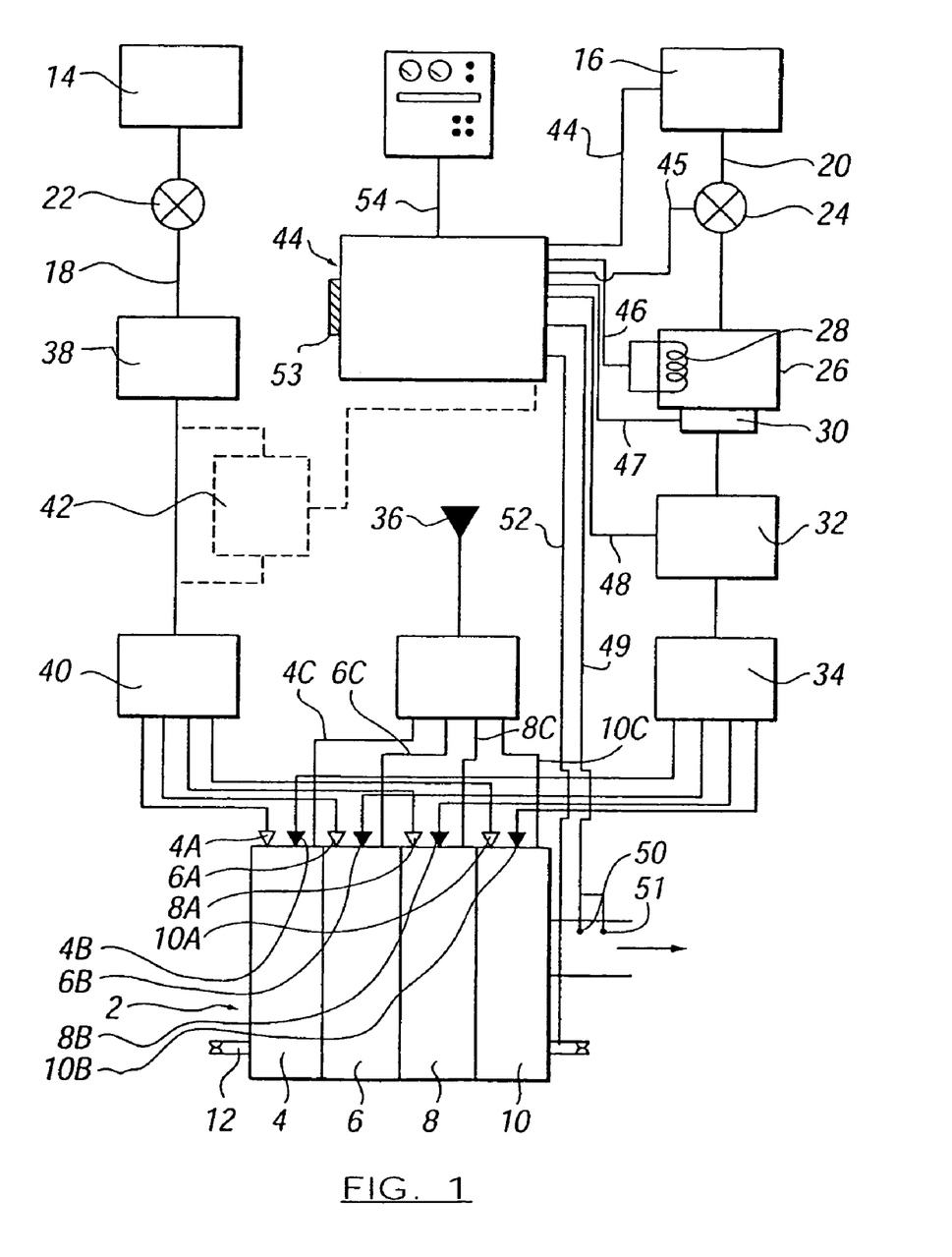
FIG. 1 shows a schematic representation of a diesel engine converted for use as a dual fuel engine.
Figure 4:
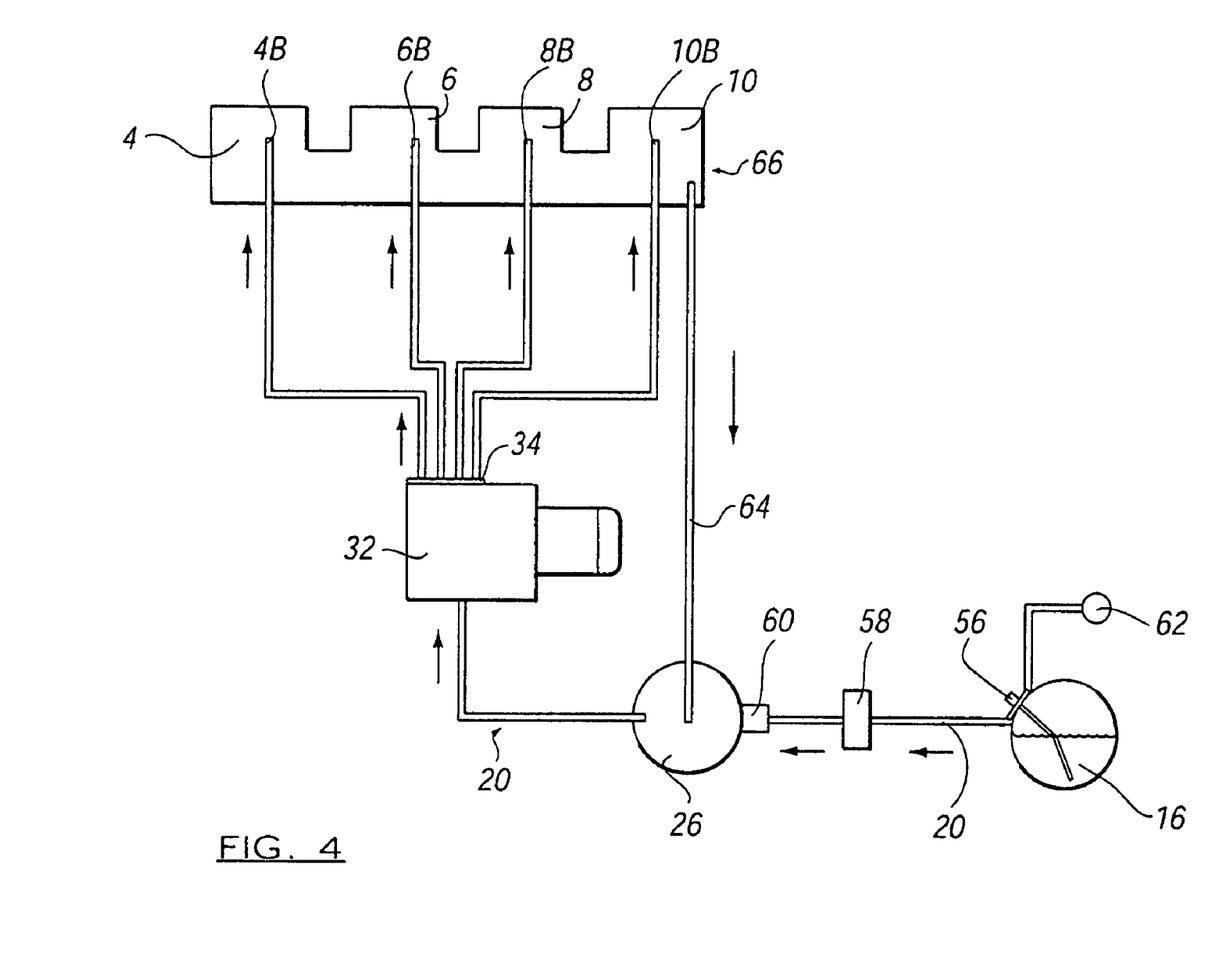
FIG. 4 is a schematic diagram of the flow of LPG to the engine.

Referring to FIGS. 1 and 4, there is provided an engine 2 comprising four cylinders 4, 6, 8, 10 in which pistons are disposed (not shown) mounted on a drive shaft 12 by which power is delivered from the engine. Each of the cylinders is provided with a pair of injectors 4A, 4B, 6A, 6B, 8A, 8B, 10A, 10B, and air inlets 4C, 6C, 8C, 10C.

The engine is supplied with two different fuels from separate tanks 14, 16, and the fuel is delivered from these tanks to the injectors 4A, 4B, 6A, 6B, 8A, 8B, 10A, 10B via supply pipes 18, 20. Emergency shut off valves 22, 24 are disposed proximate the tanks for obvious purposes.

The tank 16 is adapted to contain slightly pressurised LPG (to liquefy same), and this LPG is delivered firstly to a vaporiser unit 26 having a heater 28 therein. A diaphragm 30 is also provided in this vaporiser. Thereafter, the LPG flows along the supply pipe 20 to a flow control unit (FCU) 32 which can also be adjusted to alter the volume of LPG allowed to pass therethrough. From the FCU, the LPG flow enters a multi-output unit 34 which divides the flow into four separate flows which are then delivered to the LPG injectors 4B, 6B, 8B, 10B.

An air supply is provided at inlet 36, and regardless of whether normally aspirated or turbocharged, the air is also divided into four separate flows delivered to the air inlets on each cylinder.

Finally, diesel fuel is provided in tank 14 and after passing through the emergency shut off valve 22 enters a diesel pump 38 as is conventional for diesel engines, and subsequently the flow of diesel emerging therefrom is passed to a second multi-output unit 40 whereafter four separate supplies of diesel are delivered to the diesel fuel injectors 4A, 6A, 8A, 10A.

In accordance with a particularly preferred aspect of the invention, the diesel fuel may also pass through a flow control unit 42, indicated by dotted lines, but this feature is optional.

In accordance with the invention, and to control the operation of the engine in a desired manner, an integrated control unit (ICU) 44 is provided. The ICU primarily acts to dynamically control the volumetric quantity of LPG delivered to the cylinders of the engine, and may also be used to control the temperature and pressure thereof also. It may also be used to dynamically control the temperature and pressure of the LPG, and although such control would be unprecedented and complex, it is certainly within the bounds of this invention.

Solenoid valves 56, 58, 60 are controlled by the ICU to allow flow of LPG to vaporiser 26. An inlet 62 can be provided for allowing filling of LPG tank 16. A turbo pressure transfer pipe 64 also communicates between the inlet manifold 66 of the engine and vaporiser 26, thereby providing a feedback loop so that as turbo pressure increases, LPG gas pressure is increased.

The ICU typically utilises a digital signal processor (DSP) based micro-controller to implement a software controlled system. The system includes a self-adaptive function in order to maximise efficiency and adaptability.

In this regard the ICU receives a plurality of inputs and has a plurality of outputs. In particular, the ICU receives inputs/delivers outputs as follows:

- (44, input) from a gauge in the tank 16 to provide a measure of the amount of LPG remaining in said tank
- (45, input/output) to close or detect the condition of emergency shut off valve 24
- (46, input/output) from the heater within the vaporiser to determine/set the LPG temperature leaving the vaporiser
- (47, input/output) from the diaphragm of the vaporiser to determine/set the position thereof
- (48, input/output) from the FCU to determine/set the position of the piston therein to finely adjust the volumetric flow rate therethrough
- (49, input) from one or more exhaust probes 50, 51 for measuring particulate content/constitution/density of exhaust gases (one particular type of such a probe is a so-called "lambda" probe developed and sold by Volkswagen Audi Group AG of Germany)
- (52, input) from a sensor adjacent or on the drive shaft to monitor engine speed
- (53, input/output) a service connector to allow service and other authorised personnel with suitable computer equipment to adjust the workings of the ICU and upload parameters for fine tuning/calibration thereof
- (54, input/output) a connection with a User Interface comprising one or more indicator or LEDs for demonstrating any or any combination of:—
  - that the system is functioning correctly and within desired operating ranges,
  - that there is sufficient LPG in the tank,
  - that the system is operative, or for enabling the system to be switched off (in which case the engine would revert to operation as a conventional diesel engine—this is entirely possible)

More specifically, the ICU applies a three-dimensional map based on inputs from accelerator position and engine speed to determine the appropriate secondary fuel delivery to the cylinders for any given driving speed or load condition. In addition a piezoelectric vibration sensor (knock sensor) is used to rapidly modify gas flow to prevent sustained pre-ignition (knocking).

The ICU includes appropriate electronic circuitry and software to allow the correct LPG delivery to be calculated for a pre-determined road speed and/or varying load and accelerator position for engines fitted with cruise control systems and/or speed limiters, such as OEM ECU controlled speed limiters. Inputs are taken from OEM and/or auxiliary control sensors on the fuel/engine management system in order to allow the required flow of LPG to the engine to be determined based on the speed of the vehicle set by the cruise control or speed limiter.

One or more safety circuit inputs can also be provided to reduce or cut off the supply of secondary fuel to the engine in the event of a vehicle fitted with traction control means losing traction. The ICU detects this loss of traction and reduces or shuts off the secondary fuel supply to the engine substantially instantaneously. This shut off may only be temporary if required.

Figure 2B:
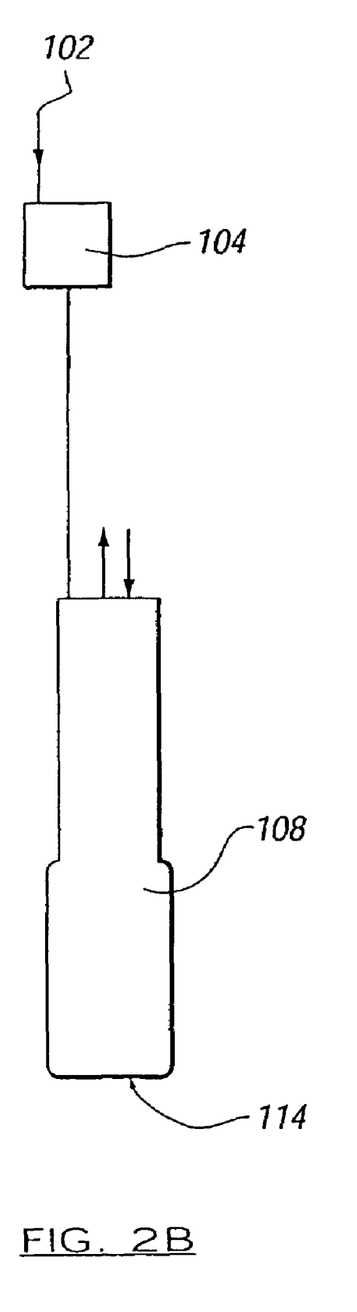
Figure 3:
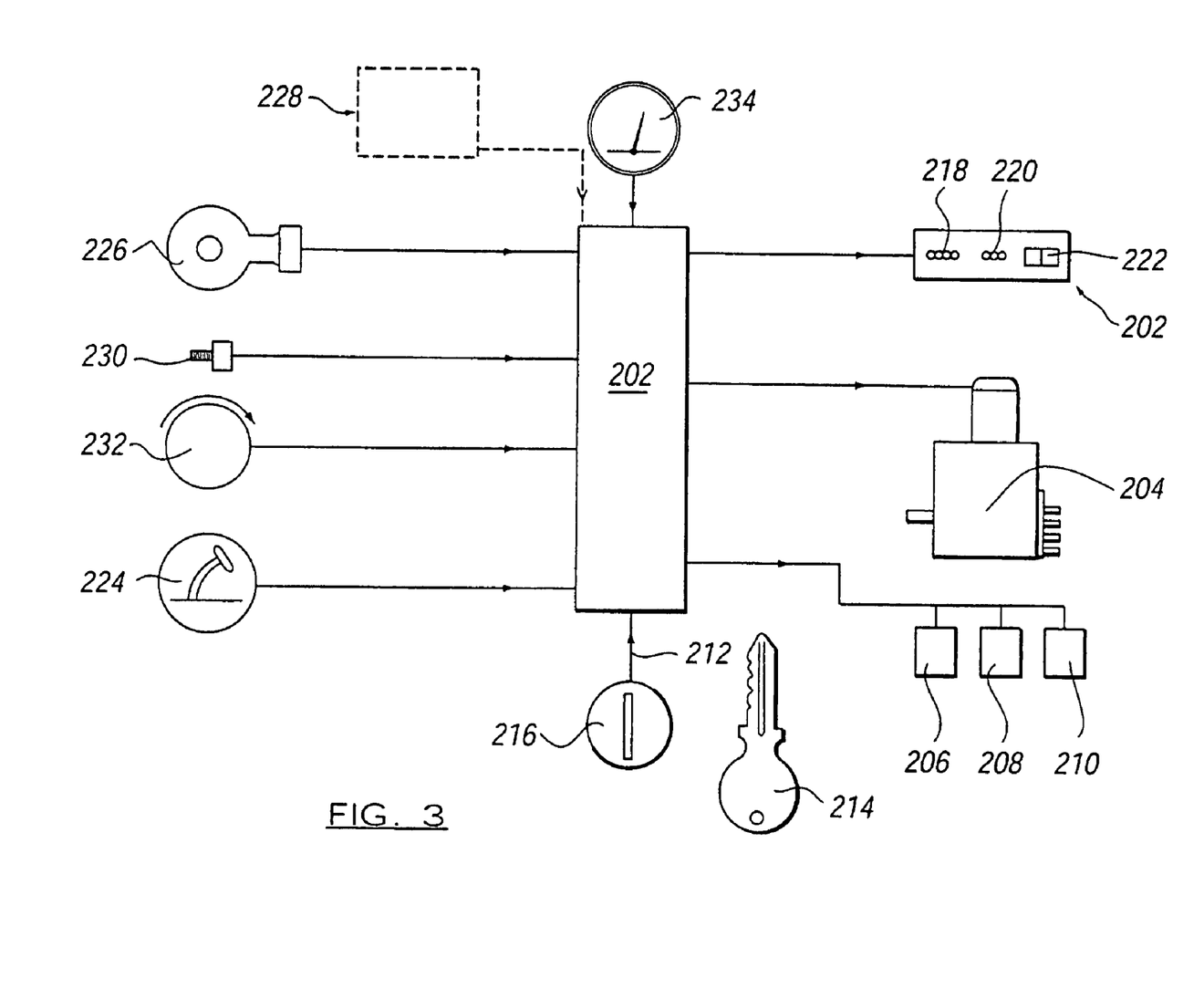
FIG. 3 is a schematic diagram of the ICU for use with an engine of the present invention, together with examples of the inputs and outputs to and from the ICU.

A number of sensors can be fitted as part of the engine system in order to provide the necessary input data to the ICU 202 (or electronic control unit (ECU)) as shown in FIG. 3. This data when input into the ICU can be used to provide adaptive feedback control in the form of a closed loop, thereby allowing the ICU to output data to adjust the engine operating parameters based on sensed readings and also allowing pre-determined parameters stored in memory in the ICU to be updated or adjusted according to changing operating conditions (termed auto-adaptive memory). The output data from ICU 202 in the example in FIG. 3 is used to control the operation of a visual display 204 in the vehicle, an actuator 204 (referenced as 104 in FIG. 2b) for controlling the flow of LPG through a gas flow valve and LPG solenoid valves 206, 208, 210. Visual display 204 can include a fuel indicator 218 for indicating the fuel levels of both diesel and LPG, a condition light or lights 220 for providing visual indication as to the operational condition of ICU 202 and a switch 222 for allowing the ICU and/or visual display to be switched on or off. An ignition signal 212 provided on actuation of an ignition key 214 in the vehicle ignition 216 to allow operation of the ICU 202.

An example of the sensors that can be provided in the engine system, as shown in FIG. 3, include the following:

A throttle position sensor (TPS) 224—the ICU can provide a reference voltage (i.e. 3V) for connection across a potentiometer acting as a TPS. The TPS 224 produces a linear voltage which increases following detection of movement of the accelerator pedal in the vehicle. The TPS is typically calibrated according to data provided by software of the ICU. It is mounted in a housing and connected to either existing accelerator linkage at the injector pump on vehicles fitted with mechanical speed limiters, or the accelerator pedal on vehicles without speed limiters. The TPS housing can be mounted adjacent to the connection site or remotely therefrom.

A knock sensor 226—A piezoelectric engine knock sensor can be fitted to the engine block to provide a "noise" input to the ICU. If the resulting measurement from this input exceeds the maximum level relating to the engine speed, fuel flow to the engine is reduced and a visual indication, such as an LED, is lit on a visual display in the vehicle. If no signal is received from the knock sensor, this indicates a sensor circuit fault and the ICU 202 is shut down.

Other inputs into the ICU include a temperature sensor 230 for measuring the temperature of a vaporiser and/or the engine, a device 232 for measuring engine speed (RPM) and fuel level gauge 234.

LPG leak sensor—An input is provided from a LPG gas sensor to detect leakage of gas in the system. If a leak is detected, the ICU is shut down, thereby shutting off the LPG supply to the engine. Air is drawn from the engine compartment via duct means and passed over the gas sensor in order for a reading to be obtained.

Oxygen Sensor 228—An input is provided for an oxygen sensor positioned in the exhaust system to measure exhaust emissions and to the check for particulates. Data provided by this sensor can be used as part of the adaptive closed loop control of the system. Other exhaust emission and particulate sensors 228 include a NoX (nitrous oxide) sensor, a microwave Receptor Sensor which is intended to pass microwaves through the exhaust gases to a receptor and an Infra-Red sensor which is intended to pass infrared light through the exhaust gasses to measure the opacity of the gasses.

If any of the sensors provided as part of the engine management system fail or the supply of LPG runs out, the engine is switched to operating on diesel fuel only, thereby allowing the continued use of the vehicle.

Figure 2A:
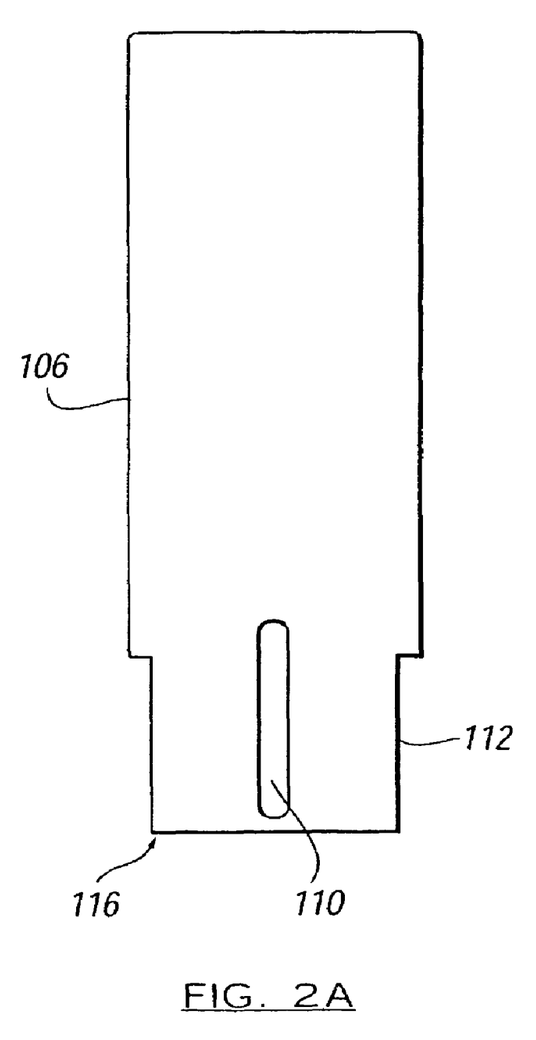
FIGS. 2a and 2b illustrates a simplified view of a cylinder of a fuel flow valve, together with a piston for movement therein.

The ICU has an output 102 which can be used to drive a linear actuator 104, such as, for example, a Sonceboz 7213. This actuator in turn operates a gas flow valve or FCU as shown in FIGS. 2a and 2b. The gas flow valve adjusts the secondary fuel flow to the fuel injectors in accurate degrees. In one embodiment, it consists of a unit with an inlet nozzle connected to a LPG supply of 1.2 bar-2.2 bar pressure. The FCU comprises a cylinder 106 in which a piston 108 is provided for reciprocating motion therein. The actuator 104 is connected directly to the piston and drives the movement of the same in the cylinder in response to the output signal received from the ICU.

A metered slot 110 is provided in an annular recessed portion 112 of cylinder 106 adjacent a lower end thereof. The lower end 114 of the piston uncovers slot 110 as it moves in the cylinder in response to the actuator, thereby allowing variable LPG flow to pass through the slot and hence through the cylinder wall. The area surrounding annular recessed portion 112 is connected to a number of outlet nozzles corresponding to the number of cylinders in the engine. The LPG passing through slot 110 is delivered through the outlet nozzles and into the cylinders of the engine. When the piston is fully extended in cylinder 106 (i.e. when end 114 of piston 108 is adjacent end 116 of cylinder 106) this closes off the LPG fuel inlet (or slot 110) and the outer wall of the piston forms a seals against the interior wall of the cylinder.

Output drivers are provided in the ICU for the development of sequential gas injection with variable injection duration with fixed or variable gas pressure. The output drivers also allow phased multi cylinder injection with variable injector duration.

In one embodiment a single stage LPG vaporiser heated by the engine coolant is used to reduce the liquid LPG to a vapour with an adjustable regulated pressure of 1.0 bar to 2.2 bar depending on vehicle application. In turbo-charged applications, the inlet manifold pressure acts upon the vaporiser diaphragm, thereby increasing the LPG delivery pressure proportionally.

The ICU is an important feature of the present invention, and in particular it is to be mentioned that the full dynamic, continuously altering control of the volumetric quantity of LPG is dependent on operating conditions, and particularly dependent on a measurement of exhaust gas quality, which is revolutionary and has provided significant engine operating efficiency and power output benefits.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

The invention claimed is:

1. A dual-fuel engine, the engine being supplied with diesel fuel and at least one secondary fuel, the engine comprising:
   one or more cylinders in which one or more pistons, reciprocate;
   diesel injection means provided to each of the one or more cylinders for injecting the diesel fuel into the cylinder during an appropriate stroke of the piston;
   at least one air inlet valve provided to each of the one or more cylinders, the at least one valve moving to an open condition during the appropriate stroke of the piston to permit air flow therethrough;
   secondary fuel injection means provided to each of the one or more cylinders for injecting the secondary fuel into the cylinders, the secondary fuel injection means being independent of the diesel fuel injection means and air inlet valves;
   an electronic control unit (ECU) including micro-processing means for dynamically controlling one or more engine operating characteristics; and
   vaporizing means for reducing liquid secondary fuel to gas upstream of the secondary fuel injection means to allow delivery of the secondary fuel in gaseous form to the secondary fuel injection means, wherein the vaporizing means is under the control of the ECU to allow dynamic control of delivery of the gaseous secondary fuel to the secondary fuel injection means.

2. An engine according to claim 1 characterized in that control of the operation of the secondary fuel injection means is independent of the operation of the diesel injection means.

3. An engine according to claim 1 characterized in that the secondary fuel injection means are controlled to introduce the secondary fuel in the one or more cylinders on the appropriate stroke of the piston reciprocating therein.

4. An engine according to claim 1 characterized in that the engine is provided with two fuel supply tanks for the diesel fuel and secondary fuel respectively, each fuel being delivered to the engine through separate supply means.

5. An engine according to claim 1 characterized in that injection of the secondary fuel into the one or more cylinders occurs substantially simultaneously to injection of the diesel fuel into said cylinders.

6. An engine according to claim 1 characterized in that means are provided for sensing and/or controlling one or more engine operating conditions.

7. An engine according to claim 6 characterized in that sensing means are provided for sensing any or any combination of exhaust emissions, exhaust gas particulate density, throttle position, temperature of the secondary fuel being delivered to the engine and/or the engine itself, turbo pressure, airflow velocity and pressure, secondary fuel gauge, engine speed, position of a flow control means and/or position of the diaphragm in the vaporizing means.

8. An engine according to claim 6 characterized in that flow control means are provided for regulating the amount of secondary fuel flowing into the engine.

9. An engine according to claim 8 characterized in that control of the flow of the secondary fuel to the secondary fuel injection means by said flow control means is regulated dynamically according to one or more sensed engine operating characteristics.

10. An engine according to claim 8 characterized in that the flow control means are provided in fuel supply pipes supplying secondary fuel to the engine.

11. An engine according to claim 8 characterized in that an output of the flow control means is coupled to an input of a multi-output divider for dividing a singular flow of secondary fuel into a plurality of flows, the number of flows corresponding to the number of cylinders in the engine and each of said flows being coupled to the secondary fuel injection means.

12. An engine according to claim 8 characterized in that the flow control means includes a piston, the position of which is changed to alter the amount of secondary fuel flowing therethrough.

13. An engine according to claim 8 characterized in that the ECU controls both the flow control means and the diaphragm in the vaporizing means for regulating the flow of the secondary fuel through each component.

14. An engine according to claim 1 characterized in that the ECU includes at least one of:
   a) one or more inputs in communication with sensing means disposed in and/or around the engine for sensing one or more operating characteristics thereof
   b) means capable of receiving and/or processing a user input
   c) calibration means through which maintenance and adjustment of one or more algorithms and/or operating parameters of the ECU can be achieved
   d) one or more outputs for displaying data relating to the operating characteristics of the engine; and
   e) one or more outputs for connection to one or more dynamically adjustable components of the engine for dynamic control thereof during engine operation.

15. An engine according to claim 14 characterized in that calculations resulting from executing the one or more algorithms are used to set the vaporizer diaphragm or piston of the flow control means to an optimum level for the detected operating conditions.

16. An engine according to claim 1 characterized in that the ECU controls the flow of secondary fuel through a diaphragm in the vaporizing means and/or the temperature of a heating element provided therein.

17. An engine according to claim 1 characterized in that operation of the ECU is substantially continuous.

18. An engine according to claim 1 characterized in that the ECU includes memory means for storing one or more pre-determined engine operating conditions therein.

19. An engine according to claim 18 characterized in that the memory means includes one or more algorithms which can be executed by processing means when pre-determined conditions are met.

20. An engine according to claim 19 characterized in that said pre-determined conditions include any or any combination of when the engine is started, when the secondary fuel runs out and/or when the load on the engine reaches a pre-determined level or is outside a pre-determined level.

21. An engine according to claim 19 characterized in that at least one recalibration algorithm is provided for allowing the ECU to adjust its operation as the engine and its associated component undergo wear.

22. An engine according to claim 18 characterized in that data input from sensing means to the ECU is compared to pre-determined engine operating conditions and the ECU outputs data to adjust the flow of the secondary fuel to the engine and/or one or more other engine operating parameters.

23. An engine according to claim 1 characterized in that a secondary fuel limiter is provided to prevent "over-powering" of the engine.

24. An engine according to claim 1 characterized in that emergency shut off valves are provided in fuel supply means which deliver the diesel fuel and the secondary fuel to the engine.

25. An engine according to claim 1 characterized in that traction control means are provided and, on detection of a loss of traction, the supply of secondary fuel to the engine is reduced or cut off.

26. An engine according to claim 1 characterized in that the secondary fuel is liquefied petroleum gas (LPG).

27. A method of converting a diesel engine to a dual-fuel engine, the engine being supplied with diesel fuel and at least one secondary fuel, the engine comprising:
   one or more cylinders in which one or more pistons reciprocate;
   injection means for injecting diesel fuel into the cylinder during an appropriate stroke of the piston; and
   at least one air inlet valve, said valve moving to an open condition during said appropriate stroke of the piston to permit air flow therethrough,
the method comprising:
   providing secondary fuel injection means to each of the one or more cylinders for injecting the secondary fuel into the cylinders, the secondary fuel injection means being provided independently to the diesel fuel injection means and air inlet valves;
   providing an electronic control unit (ECU) including micro-processing means for dynamically controlling one or more engine characteristics; and
   providing vaporizing means for reducing liquid secondary fuel to gas upstream of the secondary injection means to allow delivery of the secondary fuel in gaseous form to the secondary fuel injection means, the vaporizing means being under the control of the ECU to allow dynamic control of delivery of the gaseous secondary fuel to the secondary fuel injection means.

\* \* \* \* \*